United States Patent [19]
Kerckhove

[11] Patent Number: 5,870,432
[45] Date of Patent: Feb. 9, 1999

[54] METHOD FOR TRANSMISSION LINE IMPULSE RESPONSE EQUALIZATION AND A DEVICE TO PERFORM THIS METHOD

[75] Inventor: Jean-Francois Van Kerckhove, Nethen, Belgium

[73] Assignee: Alcatel N. V., Rijswijk, Netherlands

[21] Appl. No.: 729,429

[22] Filed: Oct. 11, 1996

[30] Foreign Application Priority Data

Oct. 11, 1995 [EP] European Pat. Off. .............. 95202735

[51] Int. Cl.$^6$ .................................................. H04L 27/01
[52] U.S. Cl. ...................... 375/232; 375/350; 364/724.2; 333/166
[58] Field of Search .................................... 375/229–233, 375/340, 341, 346, 348, 350; 333/18, 28 R, 166; 364/724.19, 724.2

[56] References Cited

U.S. PATENT DOCUMENTS

| | | | |
|---|---|---|---|
| 5,285,474 | 2/1994 | Chow et al. ............................. | 375/231 |
| 5,461,640 | 10/1995 | Gatherer .................................. | 375/231 |
| 5,675,394 | 10/1997 | Choi ........................................ | 348/614 |

OTHER PUBLICATIONS

Uyematsu T. et al. : 'A New Tap–Adjustment Algorithm for the Fractionally Spaced Equalizer', IEEE Global Telecommunications Conference Globecom '85 Conference Record (Cat. No. 85CH2190–7), Dec. 2–5, 1985, pp. 1420–1423, U.S.A.

Uyematsu T. et al.: 'An Optimization of the Stable Tap Adjustment Algorithm for the Fractionally Spaced Equalizer', IEEE International Conference on Communications, ICC '88 Conference Record (Cat No. 88CH2538–7), pp. 366–370, U.S.A.

"Equalizer Training Algorithms for Multicarrier Modulation Systems", J. Chow et al, Proc. IEEE, 1993, pp. 761–765.

"Performance Evaluation of a Multichannel Transceiver System for ADSL and VHDSL Services", P. Chow et al, *IEEE Journal on Selected Areas in Communications*, vol. 9, No. 6, Aug. 1991, pp. 909–919.

"Multicarrier E1–HDSL Transceiver System with Coded Modulation", P. Chow et al, *Journal of European Transactions on Telecommunications & Related Technologies*, vol. 4, No. 3, May–Jun. 1993, pp. 23–32.

"Interface Between Networks and Customer Installation— Asymmetric Digital Subscriber Line (ADSL) Metallic Interface Specifications" ANSI Draft Amer. National Standard for Telecommunications, pp. 22–24.

"Adaptive Channel Memory Truncation for Maximum Likelihood Sequence Estimation", D. Falconer et al, AT&T 1973, *The Bell System Technical Journal*, vo. 52, No. 9, Nov. 1973, pp. 1541–1562.

*Primary Examiner*—Amanda Le
*Attorney, Agent, or Firm*—Ware, Fressola, Van Der Sluys & Adolphson LLP

[57] ABSTRACT

A set of parameters (W) is calculated for an equalizer which equalizes a transmission line impulse response (LIR) in such a way that the equalized impulse response (EIR) approximates a target impulse response (TIR) with predetermined length (L). An error function (E) is minimized via eigenvalue-eigenvector calculation of a channel dependent matrix (O). This channel dependent matrix (O) is built up from a signal (X), a distorted signal (Y), and length (L) and delay (D) of the target impulse response (TIR). The error function (E) comprises a first contribution which represents the difference between the equalized impulse response (EIR) and the target impulse response (TIR) and a second contribution which represents the energy ($E_{DC}$) that is transmitted in unused frequency bands. The eigenvector corresponding to the minimum eigenvalue of the channel dependent matrix (O) represents the set of equalizer parameters (W).

9 Claims, 5 Drawing Sheets

METHOD FOR TRANSMISSION LINE IMPULSE RESPONSE EQUALIZATION AND A DEVICE TO PERFORM THIS METHOD

TECHNICAL FIELD

The present invention relates to a method for calculating a set of equalizer parameters, a device for calculating such a set of equalizer parameters, and a demodulator including such a device.

BACKGROUND OF THE INVENTION

Such a method and equipment to perform such a method are already known in the art, e.g. from the article 'Adaptive Channel Memory Truncation for Maximum Likelihood Sequence Estimation', written by D. D. Falconer and F. R. Magee, Jr., and published in *The Bell System technical Journal*, Vol 52, No. 9, November 1973, from page 1541 to page 1562. As described in the second paragraph of the introduction on page 1541, an equalizer or linear prefilter which forces the overall impulse response of the channel prefilter combination to approximate a desired truncated impulse response is presented therein. The overall impulse response of the channel prefilter combination is equivalent to the equalized impulse response mentioned in the preambles of the independent claims hereof, while therefor the desired truncated impulse response in the above mentioned article is called a target impulse response with predetermined length in the present application. In the known method, the desired impulse response is obtained by calculating an eigenvector corresponding to the minimum eigenvalue of a certain channel dependent matrix. This channel dependent matrix and more specifically the minimum eigenvalue thereof is representative for a mean square error between the output of the prefilter and the output of the desired prefilter, the desired prefilter having an impulse response equal to the just mentioned desired truncated impulse response. When minimizing the mean square error, the desired impulse response is optimized. As is proven in section III of the above cited article, the known method then adaptively or iteratively calculates the linear prefilter parameters from the desired truncated impulse response. Thereto, in successive iterations, the Viterbi algorithm is applied to the prefilter output, the result thereof is applied to the desired prefilter and the output of this desired prefilter is subtracted from the prefilter output in such a way that an error sequence for adjustment of the desired impulse response and prefilter parameter set is obtained. The receiver structure allowing to perform the known method is drawn in FIG. 3 on page 1545 of the above mentioned article. Although the known technique or derivatives thereof wherein e.g. the Viterbi algorithm is not used exhibit very low mean square error values and as a consequence a theoretically negligible intersymbol interference, its applicability in ADSL (Asymmetric Digital Subscriber Line) is doubtful. The main reason is linked to the finite precision limitations of the hardware. Indeed, the equalizer transfer function obtained when applying the known technique in ADSL; will boost the unused frequency band, i.e. the frequency band below 25 kHz, and will attenuate the tones in the ADSL passband, which approximately cover the frequency band from 25 kHz to 138 kHz. A first consequence is the decrease of numerical stability. It is even possible that the attenuation is so severe that the first stages of an FFT demodulator as is used in ADSL receivers rounds off the frequency components to zero such that the frequency domain equalizer of the receiver is unable to boost these tones again. An additional consequence is that, by implementing the known method in ADSL, the attenuation is very severe at the filter boundaries between the unused and used frequency bands. This is a result of the very sharp filter edges there. The pilot tone will very likely be located close to the region where the transmission channel exhibits a relatively low attenuation. This is mostly located near the lower downstream filter edge. Synchronization may therefore be subjected to an unexpected decrease of the signal to noise ratio of the pilot tone.

DISCLOSURE OF INVENTION

An object of the present invention is to provide a method and equipment for calculating a set of equalizer parameters of the above known type but wherein numerical instability due to amplification of unused frequency bands and attenuation of used frequency bands is optimized, and wherein the above mentioned synchronization problem is avoided.

According to the invention, this object is achieved in the method for calculating a set of T equalizer parameters W, T being a positive integer number, for an equalizer included in a receiver to which a transmitter is coupled via a transmission line and which is able to receive a distorted signal Y distorted due to transmission over said transmission line of a signal X, and which is adapted to equalize a transmission line impulse response LIR of said transmission line and to thereby generate an equalized impulse response EIR which approximates a target impulse response TIR with a predetermined target impulse response length L delayed over a predetermined delay D, said method comprising the steps of:

a. transmitting said signal X and determining said distorted signal Y in said receiver;

b. defining a first integer number of sample periods which represents said target impulse response length L;

c. defining a second integer number of sample periods which represents said predetermined delay D;

d. generating a channel dependent matrix O from said signal X, said distorted signal Y, said target impulse response length L and said predetermined delay D, said channel dependent matrix O being related to an error function that has to be minimized;

e. calculating a minimum eigenvalue $\lambda_{MIN}$ of said channel dependent matrix O;

f. calculating an eigenvector of said channel dependent matrix O, said eigenvector corresponding to said minimal eigenvalue $\lambda_{MIN}$;

g. generating said set of T equalizer parameters W from said eigenvector, characterized in that said error function comprises a first contribution, representing a difference between said equalized impulse response EIR and said target impulse response TIR, and a second contribution representing an amount of energy $E_{DC}$ transmitted in unused frequency bands.

According to the invention, the above object is also achieved in a device for calculating a set of T equalizer parameters W, T being a positive integer number, for an equalizer included in a receiver to which a transmitter is coupled via a transmission line and which is able to receive a distorted signal Y distorted due to transmission over said transmission line of a signal X, and which is adapted to equalize a transmission line impulse response LIR of said transmission line and to thereby generate an equalized impulse response EIR which approximates a target impulse response TIR with a predetermined target impulse response length, when delayed over a predetermined delay D, said device including:

a. a determining means to determine said distorted signal Y received upon transmission of said signal X;
b. a first definition means to define a first integer number of sample periods which represents said target impulse response length L;
c. a second definition means to define a second integer number of sample periods which represents said predetermined delay D;
d. a first generation means to generate a channel dependent matrix O from signal X, said distorted signal Y, said target impulse response length L and said predetermined delay D, said channel dependent matrix O being related to an error function which has to be minimized;
e. a first calculation means to calculate a minimal eigenvalue $\lambda_{MIN}$ of said channel dependent matrix O;
f. a second calculation means to calculate an eigenvector of said channel dependent matrix O, said eigenvector corresponding to said minimal eigenvalue $\lambda_{MIN}$; and
g. a second generation means to generate said set of T equalizer parameters W from said eigenvector, characterized in that said error function comprises a first contribution, representing a difference between said equalized impulse response EIR and said target impulse response TIR, and a second contribution representing an amount of energy $E_{DC}$ transmitted in unused frequency bands.

According to the invention, the above object is also achieved in a demodulator DEMOD including between an input DI and an output DO thereof, the cascade connection of an analog to digital converter ADC, a time domain equalizer TEQ, a serial to parallel converter SPC a fast fourier transform processing unit FFT, a frequency domain equalizer FEQ and a demapper DM, said analog to digital converter ADC being provided to convert a disturbed input signal applied to said demodulator input DI into a time domain digital signal, said time domain equalizer TEQ being provided to digitally filter said time domain digital signal and to thereby generate a time domain equalized signal, said serial to parallel converter SPC being provided to transform said time domain equalized signal into a time domain parallel sequence, said fast fourier transform processing unit FFT being provided to process said time domain parallel sequence and to thereby generate a frequency domain parallel sequence, said frequency domain equalizer being provided to digitally filter said frequency domain parallel sequence, and, said demapper DM being provided to demodulate said frequency domain parallel sequence and to generate therefrom an output signal applied to said demodulator output DO, said time domain equalizer TEQ including a device for calculating a set of T equalizer parameters W, T being a positive integer number, for said time domain equalizer TEQ, said demodulator DEMOD being coupled to a transmitter via a transmission line and being able to receive a distorted signal Y distorted due to transmission over said transmission line of a signal X, and which is adapted to equalize a transmission line impulse response LIR of said transmission line and to thereby generate an equalized impulse response EIR which approximates a target impulse response TIR with a predetermined target impulse response length L, when delayed over a predetermined delay D, said device including:

a. A determining means to determine said distorted signal Y received upon transmission of said signal X;
b. a first definition means to define a first integer number of sample periods which represents said target impulse response length;
c. a second definition means to define a second integer number of sample periods which represents said predetermined delay D;
d. a first generation means to generate a channel dependent matrix O from said signal X, said distorted signal Y, said target impulse response length L and said predetermined delay D, said channel dependent matrix O being related to an error function which has to be minimized;
e. a first calculation means to calculate a minimal eigenvalue $\lambda_{MIN}$ of said channel dependent matrix O;
f. a second calculation means to calculate an eigenvector of said channel dependent matrix O, said eigenvector corresponding to said minimal eigenvalue $\lambda_{MIN}$; and
g. a second generation means to generate said set of T equalizer parameters W from said eigenvector, characterized in that said error function comprises a first contribution, representing a difference between said equalized impulse response EIR and said target impulse response TIR, and a second contribution representing an amount of energy $E_{DC}$ transmitted in unused frequency bands.

Indeed, by adding to the difference between the equalized and the target impulse response, a second contribution, an additional degree of freedom is provided which allows shaping of the equalizer impulse response. By adding a new error source to the mean square error criterion, the present invention prevents boosting unused frequency bands instead of used frequency bands. The higher the energy located in the unused frequency band, the higher the additional error. As a result, the present method searches for equalizer parameters which define an equalizer impulse response that does not boost unused frequency bands. From the above explanation, it is clear that in the present invention, the shortcomings with respect to numerical stability and synchronization are overcome.

A further feature of the present invention is that the first contribution to the channel dependent matrix, representing the difference between equalized and target impulse response, has the form $R_{YY}-R_{YX} \cdot R_{XX}^{-1} \cdot R_{YX}^{T}$.

Indeed, as will be proven later on in the description, modelling the transmission line in a certain predetermined way, allows the first part of the channel dependent matrix O as given by the to build up expression to be denied.

In different implementations of the present method, step d of generating a channel dependent matrix O may be simplified. Therefore, assumptions can be made. Assuming that the transmission line is not plagued by noise, or assuming, that the spectral density of the input signal applied to the transmission line by the transmitter has a flat shape, permits amplification of the mathematical expression of the channel dependent matrix O, and reduces the number of calculations necessary in step d to build up this matrix. For further details, reference is made to the description later on in this specification.

An additional characteristic feature of the present invention is that, in implementations thereof wherein the transmission line is not supposed to be noiseless, the noise is measured in a step included in the present method before the channel dependent matrix O is built up.

A further characteristic feature of the present method is that, in existing implementations thereof wherein the transmission line is not supposed to be noiseless, the noise is taken into account. Indeed, by modelling noise measured on the transmission line via an additive noise source, connected in cascade to a noiseless transmission line, elements of the autocorrelation matrix RYY are modified as described above. Later on, it will be seen how the expression of RYY is mathematically derived.

Yet a further characteristic feature of the present method is that, the predetermined delay (D) depends upon the amplitude and the index number of a sample of said transmission line impulse response (LIR) with maximum amplitude. The second number of sample periods can be expressed as a function of the amplitude and the sample index number of the transmission line impulse response sample with the highest amplitude. This feature corresponds to the intuitive feeling that the shorter target impulse response will approximate the transmission line impulse response in an optimized way only if this shorter target impulse response is delayed in such a way that the location in time of its peak values approximate the peak values of the transmission line impulse response.

In a further implementation of the method according to the present invention, before executing steps f and g, steps c, d and e are repeatedly executed for a sequence of acceptable delay values. The second integer number of sample periods is different in successive executions of step c but laying within an interval of acceptable delay values, said channel dependent matrix O generated in successive executions of step d as a result thereof being different in such a way that a plurality of minimum eigenvalues similar to said minimum eigenvalue $\lambda_{MIN}$ is calculated in successive executions of said step e, and that to perform steps f and g, only a said channel dependent matrix O with smallest said minimum eigenvalue $\lambda_{MIN}$ is selected. In this way, for each delay value within an interval of acceptable delay values, a corresponding channel dependent matrix having its specific minimum eigenvalue is found. It will again be proven later on that this minimum eigenvalue is a measure for the error function that must be minimized, and therefore, in this further embodiment, only the channel dependent matrix with the smallest minimum eigenvalue is maintained to calculate therefrom in steps f and g the set of equalizer parameters.

These and other objects, features and advantages of the present invention will become more apparent in light of the following detailed description of a best mode embodiment thereof, as illustrated in the accompanying drawings.

Figure 3:
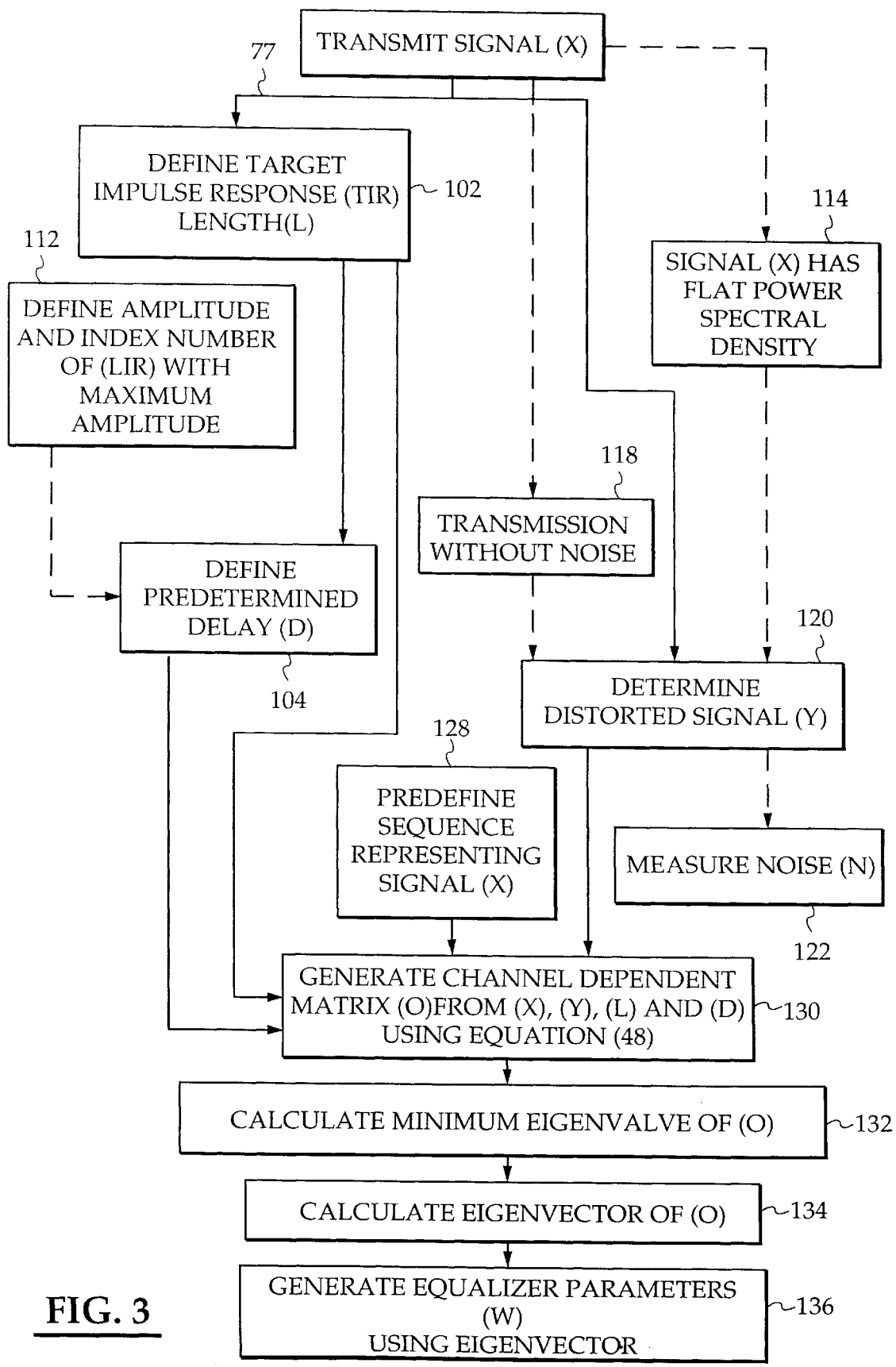
FIGS. 3A and 3B represent a flowchart for the method of calculating an set of equalizer parameters (W).
Figure 4:
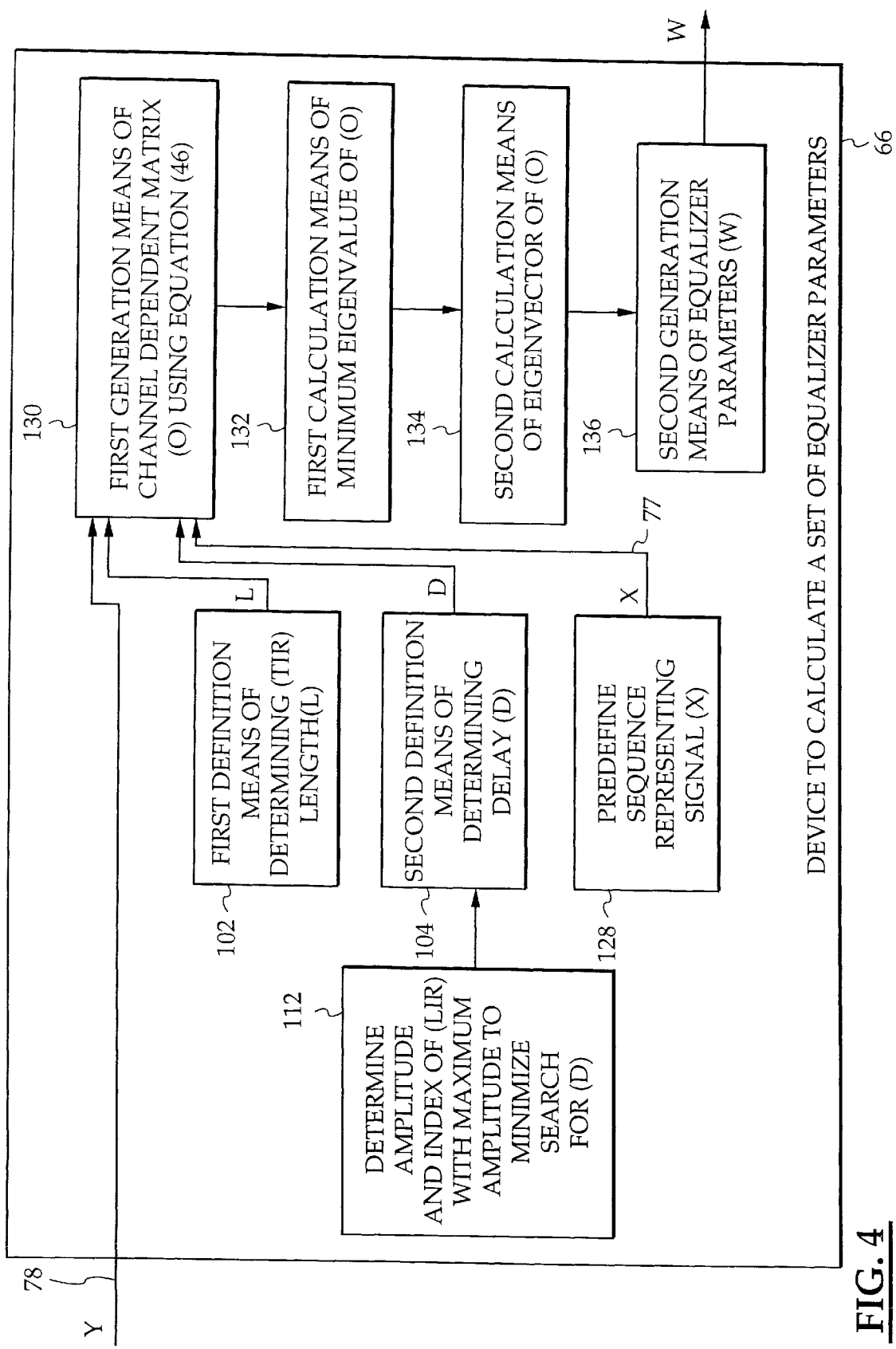
FIG. 4 represents a block diagram of a device for calculating a set of equalizer parameters (W).

The reference numeral for a particular step of the method shown in FIG. 3A and FIG. 3B has been made equivalent to the reference number of the corresponding block which performs that step in the device shown in FIG. 4.

BEST MODE FOR CARRYING OUT THE INVENTION

In a theoretically ideal muliticarrier system, i.e. in a system with infinitely large data symbols, the impulse response length of the transmission line is negligible compared to the length of data symbols transmitted over this transmission line. In known multicarrier systems, however, acceptable latency or maximum acceptable delay between input and output of data symbols transmitted over a transmission line limits the length of these symbols. As is specified in section 6.2.11 on page 22 of the draft American National Standard for Telecommunications on ADSL (Asymmetric Digital Subscriber Line), published by *ANSI (American National Standards Institute)* in April 1994, the length of a discrete multi tone (DMT) symbol is limited. In ADSL applications, the transmission line impulse response length is not negligible compared to the symbol length and intersymbol interference will occur. As a consequence, successively transmitted symbols are spread out and interfere as a result of which the transmission is distorted.

In general, two different techniques are known to compensate for such intersymbol interference. In a first technique, called cyclic prefix extension, data symbols are extended at the transmitters. Gaps are created at the edges of the data symbols e.g. by inserting spare time between successive symbols. In these gaps intersymbol interference can occur without distorting the transmission. The transmission efficiency or throughput efficiency, however, decreases with increasing lengths of the gaps or cyclic extensions. In the second intersymbol interference compensating technique, the transmission line impulse response is equalized by an equalizer, which is a digital filter at the receiver's side. The objective of the equalizer is to compress the transmission line impulse response to a shorter overall impulse response. Full equalization of the transmission line impulse response however requires a large amount of computation. The draft ADSL Standard already mentioned above specifies the combination of both techniques. Equalizing the transmission line impulse response renders the transmission line impulse response length short enough to enable intersymbol interference compensation via cyclic prefix extension with tolerable prefix length, and vice versa: compensation via cyclic prefix extension allows the equalizer to be of acceptable computation complexity.

In the following paragraphs, an algorithm will be derived which enables calculation of equalizer parameters in a fast and stable way. Before entering the mathematical approach of the problem, the ADSL (Asymmetric Digital Subscriber Line) environment, i.e. the demodulating part, wherein such an equalizer is used, will be described.

Figure 1:
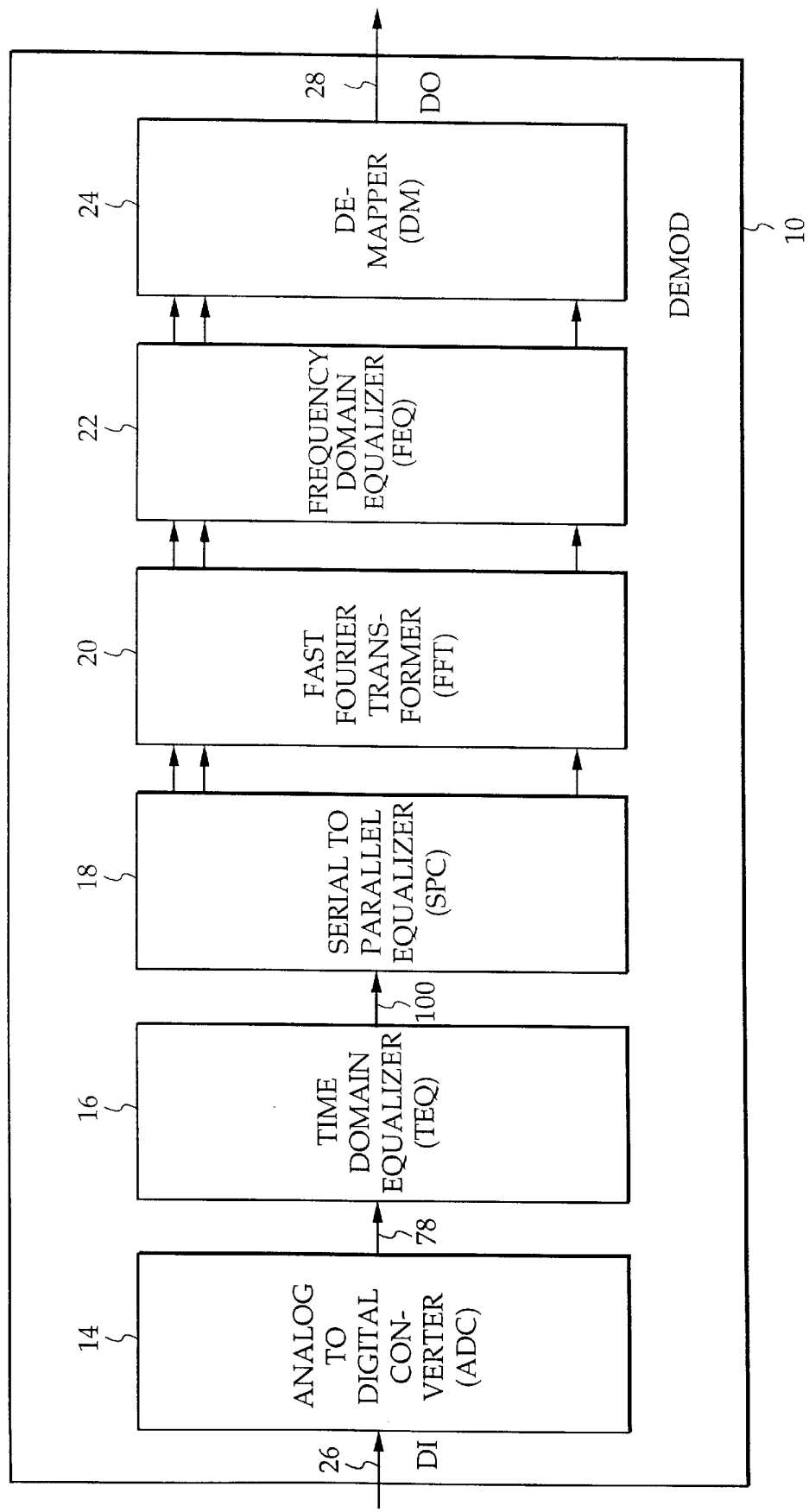
FIG. 1 represents a block scheme of an embodiment of a demodulator according to the present invention.

The demodulator DEMOD 10 of FIG. 1 includes an analog to digital converter ADC 14, a time domain equalizer TEQ 16, a serial to parallel converter SPC 18, a fast fourier transform processing unit FFT 20, a frequency domain equalizer FEQ 22, and a demapper DM 24 which are connected in cascade between an input DI 26 and an output DO 28 of the demodulator DEMOD 10.

Distorted signals at the output of the transmission line, connected to the demodulator input DI 26 but not shown in FIG. 1, enter the demodulator DEMOD 10 via the input DI 26. Such a distorted signal is sampled by the analog to digital converter ADC 14 to be converted into a time domain digital sequence which is applied to the equalizer TEQ 16. The time domain equalizer TEQ 16 is a digital filter whose set of parameters is calculated based on channel dependent information in accordance with the method of the present invention. In this way, by digitally filtering the time domain digital sequence, the overall impulse response length is shortened. The resulting equalized time domain digital sequence is transformed into an equalized parallel time domain digital sequence by the serial to parallel converter SPC 18. The fast fourier transform processing unit FFT 20 converts the equalized parallel time domain digital sequence into an equalized frequency domain parallel digital sequence and applies this sequence to the frequency domain equalizer FEQ 22 which restores amplitude and phase of the transmitted vectors, and to the demapper DM 24. This equalized frequency domain parallel digital sequence is a sequence of real data which represents a set of modulated carriers. These carriers have equidistant frequencies, carry different amounts of data bits which are modulated thereon via different modulation techniques. To determine the number of data bits that are allocated to different carriers and to determine the modulation techniques used to modulate different carriers, a mapper included in the transmitter must communicate with the demapper DM 24 in the receiver. This mapper e.g. assigns 2 data bits to the first carrier and decides to modulate these 2 bits thereon via 4 QAM modulation, assigns 4 data bits to the second carrier and decides that these 4 data bits are modulated thereon via 16 QAM modulation, and so on. The demapper DM 24 included in the demodulator DEMOD 10 at the receiver's side is made aware of the modulation techniques used for the different carriers and the number of bits allocated to each of the carriers. The task of the demapper DM 24 is thus to demodulate each carrier and to obtain therefrom the exact number of data bits modulated thereon. The demapper DM 24 then constitutes an output sequence and supplies this output sequence to the demodulator output DO 28.

The block scheme of the Discrete Multi Tone demodulator DEMOD 10 in FIG. 1 will not be described in further detail since such a detailed description is of no importance for the present invention. Further details with respect to ADSL requirements are described in the already mentioned draft ANSI Standard on ADSL while specific implementations of Discrete Multi Tone modulators and demodulators are found in the articles 'A multicarrier E1-HDSL Transceiver System with Coded Modulation', written by Peter S. Chow, Naofal Al-Dhahir, John M. Cioffi and John A. C. Bingham and published in the issue Nr. 3 May/June 1993 of *the Journal of European Transactions on Telecommunications and Related Technologies* (ETT), pages 257–266, and 'Performance Evaluation of a Multichannel Transceiver System for ADSL and VHDSL Services' from Peter S. Chow et al., published in the issue Nr. 6 August 1991 of *the Journal of European Transactions on Telecommunications and Related Technologies* (ETT), pages 909–919.

In the following paragraphs, the method according to the present invention will be mathematically derived. Starting from a time domain model, a mathematical approach of the problem will lead to an expression of an error function and a channel dependent matrix which form the basis of the present method.

Figure 2:
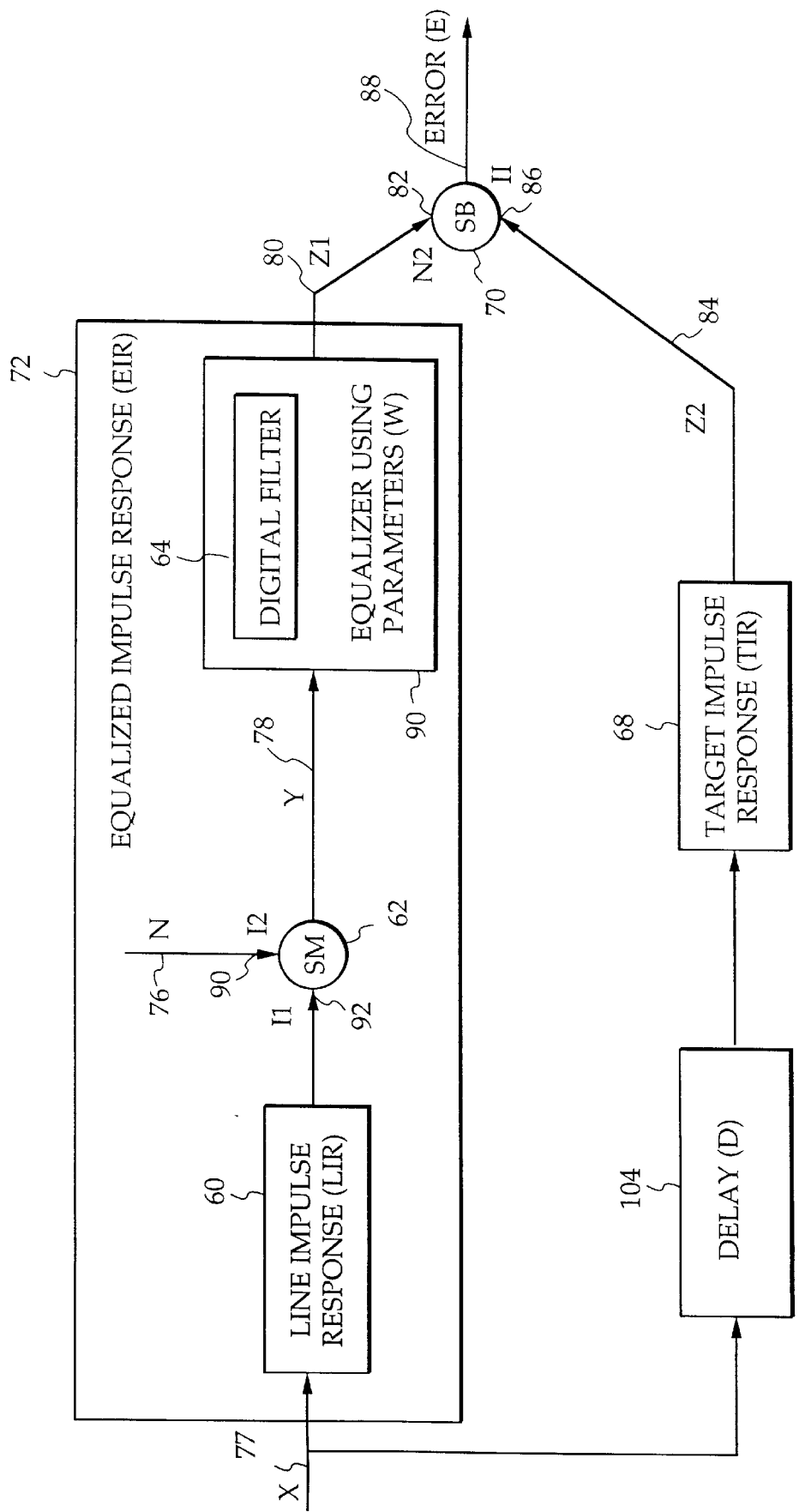
FIG. 2 represents a digital model for the cascade connection of a transmission line and an embodiment of an equalizer whose time domain equalizer parameters are calculated according to the present method.

The time domain model is drawn in FIG. 2. Therein, the transmission line is represented by the cascade connection of a noiseless transmission line with impulse response LIR 60 and an additive noise source wherein noise N 76 is added via a summer SM 62 to the output signal of the noiseless transmission line II 92. This output signal enters the summer SM 62 via a first input II 92, while the noise N 76 enters the summer SM 62 via a second input 1290 thereof. An undistorted signal X 77 applied to the noise N 76 transmission line appears at the output thereof as a distorted signal Y 78, distorted due to the transmission line impulse response LIR 60 and due to the presence of the noise N 76. To compensate for these disturbances, a digital filter 64 filters the distorted output signal Y 78. This digital filter 64 is included in an equalizer 90 characterized by a set of parameters W. The transmission line impulse response LIR 60 and the equalizer parameters W constitute an equalized impulse response EIR 72.

As already mentioned when describing the problem of intersymbol interference above the equalized impulse response EIR 72, should be short in length to enable avoiding intersymbol interference. Therefore, the equalized impulse response EIR 72 in the digital model of FIG. 2 is compared to a target impulse response TIR 68, not further specified, but with a predetermined length L representing the guardband length or cyclic prefix length. This target impulse response TIR 68, delayed over a delay D 104 must approximate the equalized impulse response EIR 72 to guarantee negligible intersymbol interference. Consequently, the mismatch between the equalized impulse response EIR 72 and the target impulse response TIR 68 must be minimized. As will be seen in the calculations later on, an error E 88 between the output Z1 80 of the equalizer 90 and a fictional output Z2 84 of the target impulse response TIR 68 constitutes the first contribution to an error E 88 that must be minimized. These outputs, Z1 80 and Z2 84 in FIG. 2 are applied to a non-inverting input NI 82 and an inverting input II 86 of a subtractor SB 70 respectively.

The following definitions are used in the mathematical approach in the following description:

$A(z) = \sum_{i=-\infty}^{+\infty} a_i \cdot z^{-i}$ : the Z-transform $A(z)$ of a digital sequence $a_i$ whose index $i$ covers a range from $-\infty$ to $+\infty$;

$M$ : the length of the transmission line impulse response $LIR$;

$T$ : the number of taps in the digital filter of the equalizer or, in other words, the number of time domain equalizer parameters $W$;

$L$ : the length of the target impulse response $TIR$;

$D$ : the delay applied to the target impulse response $TIR$;

$H = \begin{bmatrix} h_0 \\ h_1 \\ \ldots \\ h_{M-1} \end{bmatrix}$ : the line impulse response vector;

$W = \begin{bmatrix} w_0 \\ w_1 \\ \ldots \\ w_{T-1} \end{bmatrix}$ : the equalizer time domain vector;

$B = \begin{bmatrix} b_0 \\ b_1 \\ \ldots \\ b_{L-1} \end{bmatrix}$ : the target impulse response vector;

$X_{h,k} = \begin{bmatrix} X_k \\ X_{k-1} \\ \ldots \\ X_{k-D-L+1} \end{bmatrix}$ : a signal vector related to the line impulse response;

$X_{b,k} = \begin{bmatrix} X_{k-D} \\ X_{k-D-1} \\ \ldots \\ X_{k-D-L+1} \end{bmatrix}$ : a signal vector related to the target impulse response;

$Y_{w,k} = \begin{bmatrix} y_k \\ y_{k-1} \\ \ldots \\ y_{k-T-1} \end{bmatrix}$ : a distorted signal vector related to the equalizer time domain;

-continued

Wopt : an optimal equalizer time domain vector;
Bopt : an optimal target impulse response vector;
and
O : a channel dependent matrix.

As shown in FIG. 2 when an undistorted signal X 77 is applied to the transmission line, a distorted signal Y 78 appears at the output thereof. The k'th sample, k being an integer, of the distorted signal Y 78 does not only depend upon the k'th sample of the undistorted signal X 77 but also upon M-1 previous samples of this undistorted signal X 77. This is due to the transmission line impulse response LIR 60 which has length M. The transmission line is not perfect and as a result input samples transmitted in the past still have an influence on future output samples. The k'th output sample $Y_k$ of the transmission line can be expressed as follows:

$$y_k = \sum_{l=0}^{M-1} h_l \cdot x_{k-l} + n_k \qquad (1)$$

Herein, i represents an index and the influence of noise on the transmission line is concentrated in the term $n_k$, this being a result of the digital model of FIG. 2. Using the above defined vectors, the expression in (1) can be simplified as follows:

$$y_k = H^T X_{h,k} + n_k \qquad (2)$$

Herein, $H^T$ represents the transposed vector of H.

The distorted output signal Y 78 is applied to the equalizer 90 to be digitally filtered thereby. Since the digital filter 64 has T taps, the k'th sample $z1_k$ of the equalized output signal Z1 80 is given by the convolution $$z1_k = \sum_{l=0}^{T-1} w_l \cdot y_{k-l} \qquad (3)$$

or, when using vector expression:

$$z1_k = W^T . Y_{w,k} \qquad (4)$$

$W^T$ represents the transposed vector of W herein.

As shown in FIG. 2 when the undistorted signal X 77 is applied to a fictional filter or fictional transmission line with a target impulse response TIR 68 whose length is restricted to L taps, a second, fictional, output signal Z2 84 is obtained. The target impulse response TIR 68 is defined by the target impulse response vector B. The shape of the equalized impulse response EIR 72, which comprises the line impulse response LIR 60 and the digital filter in the time domain equalizer TEQ 16 of FIG. 1, response will be determined in such a way that it approaches the target impulse response TIR 68. To allow the equalized impulse response EIR 72 to approach the target impulse response TIR 68, a delay D 104 is applied to the target impulse response TIR 68. This delay D 104 should be considered as an additional parameter which must be determined somewhere in the method as shown in step 104 of FIG. 3A and block 104 of FIG. 4. The delayed target impulse response transforms the undistorted signal X 77 into the second output signal Z2 84, whose sample with index k is given by the convolution:

$$z2_k = \sum_{l=0}^{L-1} b_l \cdot x_{k-D-l} \qquad (5)$$

or in matrix notation:

$$z2_k = B^T X_{b,k} \qquad (6)$$

Therein, $B^T$ denotes the transposed vector of B.

As shown in FIG. 2 the target impulse response TIR 68, the time domain equalizer parameters W and the delay D 104 now have to be determined in such a way that the equalized impulse response EIR 72 approaches the target impulse response TIR 68 as closely as possible. Therefore, output signals Z1 80 and Z2 84 are compared and the mismatch between both is minimized. This error E 88 is mathematically expressed by a sequence E whose k'th component $e_k$ is given by:

$$e_k = z1_k - z2_k = \sum_{l=0}^{T-1} w_l \cdot y_{k-l} - \sum_{l=0}^{L-1} b_l \cdot x_{k-D-l} \qquad (7)$$

or, when using the vector notation:

$$e_k = W^T . Y_{w,k} - B^T X_{b,k} \qquad (8)$$

Thus, the error function that has to be minimized is equal to:

$$E\{e_k^2\} = E\{(W^T . Y_{w,k} - B^T X_{b,k})^2\} \qquad (9)$$

Therein, E 88 denotes the mean square error between Z1 80 and Z2 84. This mean square error is not dependent upon k and can thus be rewritten as follows:

$$E\{e^2\} = E\{(W^T . Y_w - B^T X_b)^2\} \qquad (10)$$

Since $$(W^T . Y_w - B^T X_b)^2 = W^T . Y_w . Y_w^T . W - 2W^T . Y_w X_b^T . B + B^T . X_b . X_b^T . B \qquad (11)$$

and by introducing the following correlation matrices:

$$R_{YY} = E\{Y_w . Y_w^T\}$$
$$R_{YX} = E\{Y_w . X_b^T\} \qquad (12)$$
$$R_{xx} = E\{X_b . X_b^T\}$$

(10) can be rewritten in the form:

$$E\{e^2\} = W^T . R_{YY} . W + B^T . R_{xx} . B - 2B^T R_{YX}^T . W \qquad (13)$$

With the following substitutions $$R_{XX} = \begin{bmatrix} R_{xx}(0) & R_{xx}(1) & \ldots & R_{xx}(L-1) \\ R_{xx}(1) & R_{xx}(0) & \ldots & \ldots \\ \ldots & \ldots & \ldots & R_{xx}(1) \\ R_{xx}(L-1) & \ldots & R_{xx}(1) & R_{xx}(0) \end{bmatrix} \qquad (14)$$

$$R_{YY} = \begin{bmatrix} R_{yy}(0) & R_{yy}(1) & \ldots & R_{yy}(T-1) \\ R_{yy}(1) & R_{yy}(0) & \ldots & \ldots \\ \ldots & \ldots & \ldots & R_{yy}(1) \\ R_{yy}(T-1) & \ldots & R_{yy}(1) & R_{yy}(0) \end{bmatrix}$$

$$R_{YX} = \begin{bmatrix} R_{yx}(D) & R_{yx}(D+1) & \ldots & R_{yx}(D+L-1) \\ R_{yx}(D-1) & R_{yx}(0) & \ldots & \ldots \\ \ldots & \ldots & \ldots & \ldots \\ R_{yx}(D-T+1) & \ldots & \ldots & R_{yx}(D+L-T) \end{bmatrix}$$

If it is assumed that the noise N 76 is uncorrelated with the undistorted signal X 77 then the following results from (14).

$$R_{xx}(k) = E\{x_{l+k} . x_l\}$$
$$R_{yy}(k) = E\{y_{l+k} . y_l\}$$
$$R_{yx}(k) = E\{y_{l+k+D} . x_l\} \qquad (15)$$

It is remarked here that:

$$R_{yx}(k) = E\{y_{l+k} \cdot x_l\} \quad (16)$$

$$= E\left\{\sum_{l=0}^{M-1} h_i \cdot x_{l+k-l} \cdot x_l\right\}$$

$$= \sum_{l=0}^{M-1} h_l \cdot E\{x_{l+k-l} \cdot x_l\}$$

$$= \sum_{l=0}^{M-1} h_l \cdot R_{xx}(k-l)$$

$$= R_{xx}(k) * h_k$$

and similar calculations prove that:

$$R_{yy}(k) = R_{xx}(k) * (h_k * h_k) \quad (17)$$

To minimize the mean square error of (13) zero crossings of a partial differential should be found. The target impulse response vector B which permits the minimization of the mean square error, i.e. the optimal target impulse response vector Bopt, in (13) is obtained by solving the following equation:

$$\frac{\delta(E\{e^2\})}{\delta(B)} = 0 \quad (18)$$

Substitution of (13) in (18) results in the following:

$$2R_{xx} \cdot B - 2R_{yx} \cdot W = 0 \quad (19)$$

which implies that the optimal target impulse response vector Bopt can be calculated once the equalizer time domain vector W is known via the formula:

$$\text{Bopt} = R_{xx}^{-1} \cdot R_{yx}^T \cdot W \quad (20)$$

Herein, $R_{xx}^{-1}$ represents the inverse matrix of the above defined autocorrelation matrix $R_{xx}$ and $R_{yx}^T$ represents the transposed matrix of the crosscorrelation matrix $R_{yx}$.

To obtain an expression of the mean square error E which depends only upon the equalizer time domain vector W, (20) is substituted in (13). Thus:

$$E\{e^2\} = W^T \cdot R_{yy} \cdot W + W^T \cdot R_{yx} \cdot (R_{xx}^{-1})^T \cdot R_{xx} \cdot R_{xx}^{-1} \cdot R_{yx}^T \cdot W - 2W^T \cdot R_{yx} \cdot (R_{xx}^{-1})^T \cdot R_{yx}^T \cdot W \quad (21)$$

which is further simplified as follows:

$$E\{e^2\} = W^T \cdot (R_{YY} + R_{YX} \cdot (R_{XX}^{-1})^T \cdot R_{YX} - 2R_{YX} \cdot (R_{XX}^{-1})^T \cdot R_{YX}^T) \cdot W \quad (22)$$

$$= W^T \cdot (R_{YY} - R_{YX} \cdot (R_{XX}^{-1})^T \cdot R_{YX}^T) \cdot W$$

From $R_{xx} \cdot R_{xx}^{-1} = 1$, wherein 1 represents the unity matrix, it follows that $(R_{xx}^{-1})^T \cdot R_{xx}^T = 1$, and thus that $(R_{xx}^{-1})^T = (R_{xx}^T)^-$.

As a result, (22) can be transformed into:

$$E\{e^2\} = W^T \cdot (R_{YY} - R_{YX} \cdot (R_{XX}^T)^- R_{YX}^T) W \quad (23)$$

From the definition of the autocorrelation matrix $R_{xx}$ in (14), it further follows that $R_{xx}^T = R_{xx}$ as a result of which:

$$E\{e^2\} = W^T \cdot (R_{YY} - R_{YX} \cdot R_{XX}^{-1} \cdot R_{YX}^T) \cdot W \quad (24)$$

$$= W^T \cdot O \cdot W$$

Herein, O is a channel dependent matrix given by the expression:

$$O = R_{YY} - R_{YX} \cdot R_{XX}^{-1} \cdot R_{YX}^T \quad (25)$$

When minimizing $E\{e^2\}$ by searching the equalizer time domain vector W which minimizes $W^T.O.W$ it is obvious that the solution:

$$W = \begin{bmatrix} 0 \\ 0 \\ \cdots \\ 0 \end{bmatrix} \text{ and thus: } Bopt = \begin{bmatrix} 0 \\ 0 \\ \cdots \\ 0 \end{bmatrix} \quad (26)$$

will be found. However, this solution would imply that no signal could be transmitted over the transmission line. To obtain another solution, different from the zero-filter, an energy constraint:

$$W^T \cdot W = 1 \quad (27)$$

has to be fulfilled.

Thus, the mean square error (24) must be minimized by taking into account the constraint (27). This is done by solving the equations:

$$\frac{\delta(E\{e^2\} - \lambda \cdot (W^T \cdot W - 1))}{\delta W} = 0 \quad (28)$$

$$\frac{\delta(E\{e^2\} - \lambda \cdot (W^T \cdot W - 1))}{\delta \lambda} = 0$$

Substituting (24) in (28) and calculating the partial derivative results in:

$$2 \cdot O \cdot W - 2 \cdot \lambda \cdot W = 0 \quad (29)$$

$$W^T \cdot W - 1 = 0$$

The second equation in (29) again represents constraint (27) which must be fulfilled. The first equation is equivalent to:

$$O \cdot W = \lambda \cdot W \quad (30)$$

The equation (30) is an eigenvalue-eigenvector problem. Since $$\min(E\{e^2\}) = \min(W^T \cdot O \cdot W) = \min(W^T \cdot \lambda \cdot W) = \quad (31)$$

$$\min(\lambda \cdot W^T \cdot W) = \min(\lambda),$$

the optimal equalizer time domain vector Wopt equals the eigenvector of O which corresponds to the minimum eigenvalue $\lambda$min thereof.

Thus, summarizing the above calculations as shown in FIG. 4, the channel dependent matrix O must be built up as shown in block 130, the minimum eigenvalue $\lambda$min as shown in block 132 and corresponding eigenvector of O 134 must be calculated. This eigenvector equals the optimized equalizer time domain vector Wopt and finally, the optimal target impulse response vector Bopt is calculated from Wopt via equation (20) as shown in block 138. Once the matrix O is known, all steps to derive therefrom the equalizer time domain parameters W are thus known.

Formula (25) shows that the channel dependent matrix O only depends on the undistorted signal X 77 and the received distorted signal Y 78. The undistorted signal X 77 is transmitted upon initialization of the system and is well known by the receiver. At reception of the distorted signal Y 78, the receiver is thus enabled to calculate the channel dependent matrix O. The dependency between O and the signals X 77 and Y 78 is expressed in (25) via the matrices $R_{XX}$, the autocorrelation matrix of the undistorted signal X 77, $R_{YY}$, the autocorrelation matrix of the distorted signal Y 78, and $R_{YX}$, the crosscorrelation matrix of the signals X 77 and Y 78. Notice however that, via $R_{YX}$, O also depends on the delay parameter D. This implies that for each delay value, a new channel dependent matrix O must be constructed, each of which yields a new Wopt and Bopt.

Simplified models and assumptions may permits the simplification of the computations necessary to construct the channel dependent matrix O.

In a first simplified implementation of the present invention, the undistorted signal X 77 has a flat power spectral density as shown in FIG. 3A step 114, while noise N 76 on the transmission line is negligible as shown in FIG. 3A step 118. Thus, the correlation matrices $R_{NN}(k)$ and $R_{XX}(k)$ are as follows:

$$R_{NN}(k)=0$$

$$R_{XX}(k)=S_X.\delta(k)$$

Therein, $S_X=E(X_l^2)$, $\delta(k)=1$ for k=0, and $\delta(k)=0$ for k≠0.

The autocorrelation matrix $R_{XX}$ therefore becomes equal to:

$$R_{XX}=S_X.I,$$

wherein 1 represents the identity matrix. Substituting these expressions for $R_{NN}(k)$ and $R_{XX}(k)$ in the above expressions (15) for $R_{YX}(k)$ and $R_{YY}(k)$, and substituting all the correlation matrices in the channel dependent matrix O (25), it is found that:

$$O = S_X\{\text{height}\overline{\overline{H}} \cdot \overline{\overline{H}}_{T\times T} - \overline{H}_{T\times L} \cdot \overline{H}_{T\times L}^T\} \tag{32}$$

with:

$$\overline{\overline{H}}_{T\times T} = \begin{bmatrix} r_h(0) & \ldots & r_h(T-1) \\ \ldots & \ldots & \ldots \\ r_h(T-1) & \ldots & r_h(0) \end{bmatrix} \tag{33}$$

and:

$$\overline{H}_{T\times L} = \begin{bmatrix} h_D & \ldots & h_{D+i-1} \\ \ldots & \ldots & \ldots \\ h_{D-T+1} & \ldots & h_{D+L-T} \end{bmatrix} \tag{34}$$

in (33):

$$r_h(k) = h_k * h_{-k} = \sum_{l=0}^{M-1} h_l \cdot h_{l+k} \tag{35}$$

When measuring in an initial step the line impulse response vector H, the matrix O can be constructed.

In a second simplified implementation of the present method, a transmission line is also noiseless as in FIG. 3A step 118, but the power spectral density of the transmitted signal X 77 is no longer flat. The given power spectral density of the undistorted signal X 77 must has to be taken into account which leads to a new expression for the matrix O.

In another implementation of the present method, noise N on the transmission line is not negligible but the power spectral density of this noise N is known via additional measurements previously executed as in FIG. 3A step 122. In this implementation, a new channel dependent matrix O is to be constructed wherein the noise influence is expressed via a term $R_{nn}(k)$ which is added to the expression in formula (17). $R_{yy}(k)$ is now given by:

$$R_{yy}(k)=R_{xx}(k)*(h_k*h_{-k})+R_{nn}(k) \tag{36}$$

Although the above described embodiments exhibit a very low mean square error value and accordingly a negligible intersymbol interference outside the guardband, the applicability thereof in ADSL is doubtful. As already indicated in the introduction, a concentration of the energy in the unused frequency band must be avoided. The main reason for this can best be explained by a frequency domain approach. Suppose that H(i) represents the channel transfer function in the frequency domain, and E(i) represents an error, equivalent to E, built up in the frequency domain. Striving towards a zero error $$E(i) \approx 0 \tag{37}$$

implies that $$W(i).Y(i)=B(i).X(i) \tag{38}$$

wherein W(i), Y (i), B(i) and X (i) are frequency domain representations of the equalizer, the distorted signal, the target response, and the signal respectively. Equation (38) is equivalent to:

$$W(i) \cdot \frac{Y(i)}{X(i)} = B(i) \tag{39}$$

and thus to:

$$W(i)H(i)=B(i) \tag{40}$$

since the channel response H(i) is equal to:

$$H(i) = \frac{Y(i)}{X(i)} \tag{41}$$

If W(i), H(i) and B(i) are split up into unused band and used band matrices, the above expression (40), because of the FDM (Frequency Division Multiplexing) filters used in ADSL is rewritten as:

$$\begin{bmatrix} W(i)^{used} \\ W(i)^{unused} \end{bmatrix} - \begin{bmatrix} 0 \\ H(i)^{unused} \end{bmatrix} = \begin{bmatrix} B(i)^{used} \\ B(i)^{unused} \end{bmatrix} \tag{42}$$

This results in three conditions:

$$\begin{cases} W(i)^{used} \text{ is unconstrained since } B(i)^{used} \approx 0 \\ W(i)^{unused} \cdot H(i)^{unused} = B(i)^{unused} \\ \text{unit energy constraint expressed in the frequency domain} \end{cases} \tag{43}$$

Although the energy unity norm avoids convergence towards the full zero solution, one notices that the unity norm does not guarantee avoidance of a full zero solution in the useful frequency band. Therefore, the equalizer coefficients W must be constrained in order to avoid a concentration the time domains energy in the used bandwidth.

In the time domain approach of the above paragraphs, the time domains energy can be concentrated in the used bandwidth by adding an additional degree of freedom. The higher the energy in the unused frequency band EDC, the less optimal the set of equalizer parameters W becomes. This is expressed by adding the energy in the unused frequency band EDC as an additional contribution to the error E. In this way, one obtains the constrained mean square error CE as shown in FIG. 4 step 128:

$$CE=E+\mu.E_{DC} \tag{44}$$

Herein, E represents the error contribution due to the difference between the equalized impulse response EIR labeled Z1 80 and the target impulse response TIR labeled Z2 84 on FIG. 4, and $E_{DC}$, 238 represents the energy in the unused frequency band or don't care band. The suppression factor $\mu$ is a factor that determines how much the energy in this unused frequency band must be suppressed. Writing $E_{DC}$ in matrix notation, one obtains:

$$E_{DC} = W^T \cdot F_{DC}^T \cdot F_{DC} \cdot W = W^T \cdot Q \cdot W \qquad (45)$$

with $$F_{DC} = \begin{bmatrix} 1 & e^{\frac{-j \cdot 2\pi \cdot a}{N}} & \cdots & e^{\frac{-j \cdot 2\pi \cdot a \cdot (T-1)}{N}} \\ \cdots & \cdots & \cdots & \cdots \\ 1 & e^{\frac{-j \cdot 2\pi \cdot b}{N}} & \cdots & e^{\frac{-j \cdot 2\pi \cdot b \cdot (T-1)}{N}} \end{bmatrix} \qquad (46)$$

Herein, a and b are indexes belonging to the unused or "don't care" band. If (13) and (45) are integrated in (44), the following result is found:

$$E_{DC} = W^T \cdot (R_{YY} + \mu \cdot Q) + B^T \cdot R_{XX} \cdot B - 2 \cdot B^T R_{YX}^T \cdot W \qquad (47)$$

It is noticed that the matrix $R_{YY}$ in (13) has been replaced by $R_{YY} + \mu Q$. As a consequence, the eigenvector solution representing the optimal set of equalizer parameters is found by solving the eigenvalue-eigenvector problem for a new channel dependent matrix O':

$$O' = (R_{YY} + \mu Q) - R_{YX} \cdot R_{XX}^{-1} \cdot_{YX}^t \qquad (48)$$

The additional term $\mu.Q$ herein can be shown to be equivalent to the insertion of a constant virtual noise power spectral density component into the unused frequency band. The term "virtual" is used here to indicate that this is not real measured noise but mathematically injected noise.

It is remarked here that although the described embodiment in the above paragraphs is a time domain realization, the present invention is also applicable in frequency domain approaches of the mean square error method. The error $e_k$ can be rewritten in terms of circular convolutions instead of linear convolutions when using the fast fourier transform. In this way, a frequency domain error criterion is obtained. Such a frequency domain approach will not be described in further detail in the present application. However, via the above described time domain example it is clear to a person skilled in the art how to adapt e.g. the frequency domain approach of J.S. Chow, J.M. Cioffi and J.A.C. Bingham in their article 'Equalizer Training Algorithms for Multicarrier Modulation Systems', *Proc. IEEE*, p. 761–765, 1993 to be in accordance with the present invention. Indeed, such a frequency domain approach can also be adjusted to the FDM requirements by modifying the frequency domain mean square error E(i) in a frequency domain constrained mean square error CE(i):

$$CE(i) = E(i) + \mu(i) \cdot |W(i)^2| \qquad (49)$$

with $$\mu(i) = \begin{cases} \mu \text{ if } i \text{ belongs to the unused band} \\ 0 \text{ if } i \text{ belongs to the used band} \end{cases}$$

It is further remarked that, for implementation issues, it is better to avoid injecting noise close to the FDM filter boundaries in order to avoid too much attenuation of the first tones of the used band. It is therefore recommended to leave a buffer zone without virtual injected noise between the unused and used frequency bands. As an alternative, one could use a shaped virtual injected noise instead of a constant virtual noise.

Still another remark is that intelligent implementations of the present should take into account that the calculated equalizer coefficients will be rounded. Therefore, it is better to reduce the dynamic range and thus to have higher gains in the used bandwidth. As a consequence, when different criteria provide equivalent solutions for Wopt and Bopt, precision requirements will be taken into account to select one of the solutions. By selecting the solution with the least dynamic range, the precision performance will be increased.

As already noticed above, the channel dependent matrix O depends on the delay parameter D. Thus, the delay value which minimizes the intersymbol interference has to be found to select the best Wopt. The complete theoretical search range for D would be from zero to M. However, without significant loss of performance, the search range for D can be reduced. To reduce the processing time, one could search for example for D values within a limited interval around Dpeak, Dpeak being the index number (between 0 and M) of the peak value of the transmission line impulse response H as shown in FIG. 3A step 112 and FIG. 4 block 112.

Furthermore, it is noted that, to reduce the computation time, the power method can be used to calculate the only eigenvector Wopt which has to be found in the present method. This very fast and iterative method is well known but extracts only the eigenvector belonging to the largest eigenvalue of a matrix. The above eigenvalue-eigenvector problem (30) therefore is rewritten as follows:

$$O \cdot W = \lambda \cdot W \leftrightarrow O^{-1} \cdot W = \lambda^{-1} \cdot W \qquad (50)$$

Thus, an eigenvector of matrix O according to eigenvalue $\lambda$ is also an eigenvector of matrix $O^{-1}$ according to the eigenvalue $\lambda^{-1}$. The eigenvector Wopt according to the minimum eigenvalue $\lambda$min of O is thus found as the eigenvector according to the maximum eigenvalue $\lambda\text{min}^{-1}$ of the matrix $O^{-1}$.

Thus the method for calculating a set of equalizer parameters W as shown in FIG. 3A and FIG. 3B includes the steps of defining the length L of the target impulse response TIR in step 102; and defining a predetermined delay D in step 104. In parallel with the above steps; the distorted signal Y is determined in step 120. The determining means for Y in step 120 could be a digital waveshaping circuit or if deemed unnecessary for some reason the determining means for Y in step 120 could be nothing more than an electrical node. A predefined sequence representing the undistorted signal X of step 128, the distorted signal Y, the length L of the target impulse response TIR and the length of the delay D are used to generate the channel dependent matrix O in step 130. The channel dependent matrix O is then used to calculate the minimum eigenvalue $\lambda_{MIN}$ of O in step 132 and the associated eigenvector of O in step 134. The eigenvector of step 132 is equivalent to the equalized time domain vector W as determined in step 136.

A device to calculate a set of equalizer parameters 66 is shown in FIG. 4 and includes a determining means which receives a distorted signal Y 78. The delay D is calculated by a means of determining D 104 discussed above and length L is provided by the definition means of determining TIR length (L) 102. The channel dependent matrix (O) is generated by the generation means of channel dependent matrix (O) 130 using a predefined sequence representing the undistorted signal (X) of block 128, the distorted signal (Y), the delay (D), and the length of the target impulse response (TIR) (L). The calculation means of minimum eigenvalue $\lambda_{MIN}$ of O and the calculation means of eigenvector of O 134 determine the corresponding eigenvector of O. The generation means of T equalized parameters W 136 equates the eigenvector of O to the equalized time domain vector W which is then output from the device.

Figure 5:
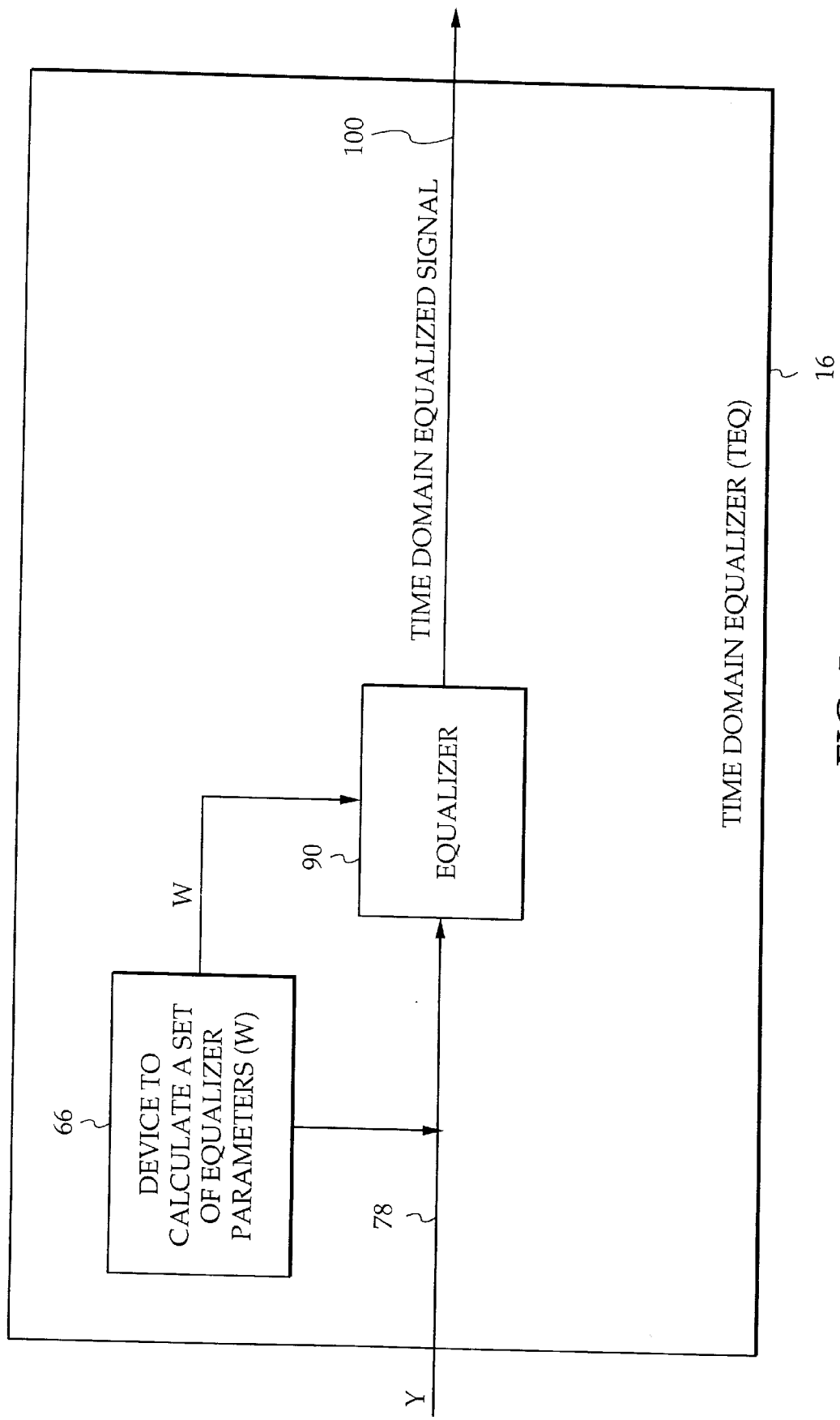
FIG. 5 represents a block diagram of the time domain equalizer TEQ.

As shown in FIG. 5 the time domain equalizer TEQ 16 includes a device to calculate a set of equalizer parameters W 66 and an equalizer 90. The distorted signal 34 Y 78 is applied to the TEQ and a time domain equalized signal 100 is output as shown in FIG. 1 and FIG. 5.

While the principles of the invention have been described above in connection with specific apparatus, it is to be clearly understood that this description is made only by way of example and not as a limitation on the scope of the invention.

I claim:

1. A method for calculating a set of T equalizer parameters (W), T being a positive integer number, for an equalizer included in a receiver to which a transmitter is coupled via a transmission line and which is able to receive a distorted signal (Y) distorted due to transmission over said transmission line of a signal (X), and which is adapted to equalize a transmission line impulse response (LIR) of said transmission line and to thereby generate an equalized impulse response (EIR) which approximates a target impulse response (TIR) with a predetermined target impulse response length (L) delayed over a predetermined delay (D), said method comprising the steps of:

a. transmitting said signal (X) and determining said distorted signal (Y) in said receiver;
   b. defining a first integer number of sample periods which represents said target impulse response length (L);
   c. defining a second integer number of sample periods which represents said predetermined delay (D);
   d. generating a channel dependent matrix (O) from said signal (X), said distorted signal (Y), said target impulse response length (L) and said predetermined delay (D), said channel dependent matrix (O) being related to an error function that has to be minimized;
   e. calculating a minimum eigenvalue ($\lambda_{MIN}$) of said channel dependent matrix (O);
   f. calculating an eigenvector of said channel dependent matrix (O), said eigenvector corresponding to said minimum eigenvalue ($\lambda_{MIN}$);
   g. generating said set of T equalizer parameters (W) from said eigenvector, characterized in that said error function comprises a first contribution, representing a difference between said equalized impulse response (EIR) and said target impulse response (TIR), and a second contribution representing an amount of energy ($E_{DC}$) transmitted in unused frequency bands, and further characterized in that, to generate said channel dependent matrix (O) said transmission line is supposed to be noiseless.

2. A method, for calculating a set of T equalizer parameters (W), T being a positive integer number, for an equalizer included in a receiver to which a transmitter is coupled via a transmission line and which is able to receive a distorted signal (Y) distorted due to transmission over said transmission line of a signal (X), and which is adapted to equalize a transmission line impulse response (LIR) of said transmission line and to thereby generate an equalized impulse response (EIR) which approximates a target impulse response (TIR) with a predetermined target impulse response length (L) delayed over a predetermined delay (D), said method comprising the steps of:

a. transmitting said signal (X) and determining said distorted signal (Y) in said receiver;
   b. defining a first integer number of sample periods which represents said target impulse response length (L);
   c. defining a second integer number of sample periods which represents said predetermined delay (D);
   d. generating a channel dependent matrix (O) from said signal (X), said distorted signal (Y), said target impulse response length (L) and said predetermined delay (D), said channel dependent matrix (O) being related to an error function that has to be minimized;
   e. calculating a minimum eigenvalue ($\lambda_{MIN}$) of said channel dependent matrix (O);
   f. calculating an eigenvector of said channel dependent matrix (O), said eigenvector corresponding to said minimum eigenvalue ($\lambda_{MIN}$);
   g. generating said set of T equalizer parameters (W) from said eigenvector, characterized in that said error function comprises a first contribution, representing a difference between said equalized impulse response (EIR) and said target impulse response (TIR), and a second contribution representing an amount of energy ($E_{DC}$) transmitted in unused frequency bands, and further characterized in that said channel dependent matrix (O) comprises a first contribution, corresponding to said first contribution of said error function, said first contribution of said channel dependent matrix (O) being equal to $R_{YY} - R_{YX} \cdot R_{XX}^{-1} \cdot R_{YX}^T$, wherein $R_{YY}$ represents an average autocorrelation matrix of a sequence of samples of said distorted signal (Y), said sequence having a length equal to T, wherein $R_{XX}$ represents an average autocorrelation matrix of a sequence of samples of said signal (X), said sequence having a length equal to said target impulse response length, wherein $R_{YX}$ represents an average cross correlation matrix of said sequence of samples of said signal (X) and said sequence of samples of said distorted signal (Y), and wherein $R_{XX}^{-1}$ represents an inverse matrix of $R_{XX}$ and $R_{YX}^T$ represents a transposed matrix of $R_{YX}$.

3. A method according to claim 2, characterized in that $R_{YY}(k)$, which is an element in said autocorrelation matrix $R_{YY}$ whose row index and column index are different from each other over an integer value k, is equal to $R_{XX}(k) \cdot rh(k) + R_{NN}(k)$, wherein $R_{XX}(k)$ represents an element in said autocorrelation matrix $R_{XX}$ whose row index and column index are different over said integer value k, wherein rh(k) represents a convolution of said transmission line impulse response (LIR) and said transmission line impulse response (LIR) delayed over k samples, and wherein $R_{NN}(k)$ represents an element in a matrix $R_{NN}$, whose row index and column index are different over said integer value k, said matrix $R_{NN}$ being an average autocorrelation matrix of noise (N) measured on said transmission line.

4. A method for calculating a set of T equalizer parameters (W), T being a positive integer number, for an equalizer included in a receiver to which a transmitter is coupled via a transmission line and which is able to receive a distorted signal (Y) distorted due to transmission over said transmission line of a signal (X), and which is adapted to equalize a transmission line impulse response (LIR) of said transmission line and to thereby generate an equalized impulse response (EIR) which approximates a target impulse response (TIR) with a predetermined target impulse response length (L) delayed over a predetermined delay (D), said method comprising the steps of:

a. transmitting said signal (X) and determining said distorted signal (Y) in said receiver;
   b. defining a first integer number of sample periods which represents said target impulse response length (L);
   c. defining a second integer number of sample periods which represents said predetermined delay (D);
   d. generating a channel dependent matrix (O) from said signal (X), said distorted signal (Y), said target impulse response length (L) and said predetermined delay (D), said channel dependent matrix (O) being related to an error function that has to be minimized;

e. calculating a minimum eigenvalue ($\lambda_{MIN}$) of said channel dependent matrix (O);

f. calculating an eigenvector of said channel dependent matrix (O), said eigenvector corresponding to said minimum eigenvalue ($\lambda_{MIN}$);

g. generating said set of T equalizer parameters (W) from said eigenvector, characterized in that said error function comprises a first contribution, representing a difference between said equalized impulse response (EIR) and said target impulse response (TIR), and a second contribution representing an amount of energy ($E_{DC}$) transmitted in unused frequency bands, and further characterized in that, to generate said channel dependent matrix (O), said signal (X) applied to said transmission line by said transmitter is supposed to have a flat power spectral density.

5. A method for calculating a set of T equalizer parameters (W), T being a positive integer number, for an equalizer included in a receiver to which a transmitter is coupled via a transmission line and which is able to receive a distorted signal (Y) distorted due to transmission over said transmission line of a signal (X), and which is adapted to equalize a transmission line impulse response (LIR) of said transmission line and to thereby generate an equalized impulse response (EIR) which approximates a target impulse response (TIR) with a predetermined target impulse response length (L) delayed over a predetermined delay (D), said method comprising the steps of:

a. transmitting said signal (X) and determining said distorted signal (Y) in said receiver;

b. defining a first integer number of sample periods which represents said target impulse response length (L);

c. defining a second integer number of sample periods which represents said predetermined delay (D);

d. generating a channel dependent matrix (O) from said signal (X), said distorted signal (Y), said target impulse response length (L) and said predetermined delay (D), said channel dependent matrix (O) being related to an error function that has to be minimized;

e. calculating a minimum eigenvalue ($\lambda_{MIN}$) of said channel dependent matrix (O);

f. calculating an eigenvector of said channel dependent matrix (O), said eigenvector corresponding to said minimum eigenvalue ($\lambda_{MIN}$);

g. generating said set of T equalizer parameters (W) from said eigenvector, characterized in that said error function comprises a first contribution, representing a difference between said equalized impulse response (EIR) and said target impulse response (TIR), and a second contribution representing an amount of energy ($E_{DC}$) transmitted in unused frequency bands, and further characterized in that, to generate said channel dependent matrix (O), said transmission line is not supposed to be noiseless and that said method further includes a step of measuring noise (N) on said transmission line before said channel dependent matrix (O) is generated.

6. A method for calculating a set of T equalizer parameters (W), T being a positive integer number, for an equalizer included in a receiver to which a transmitter is coupled via a transmission line and which is able to receive a distorted signal (Y) distorted due to transmission over said transmission line of a signal (X), and which is adapted to equalize a transmission line impulse response (LIR) of said transmission line and to thereby generate an equalized impulse response (EIR) which approximates a target impulse response (TIR) with a predetermined target impulse response length (L) delayed over a predetermined delay (D), said method comprising the steps of:

a. transmitting said signal (X) and determining said distorted signal (Y) in said receiver;

b. defining a first integer number of sample periods which represents said target impulse response length (L);

c. defining a second integer number of sample periods which represents said predetermined delay (D);

d. generating a channel dependent matrix (O) from said signal (X), said distorted signal (Y), said target impulse response length (L) and said predetermined delay (D), said channel dependent matrix (O) being related to an error function that has to be minimized;

e. calculating a minimum eigenvalue ($\lambda_{MIN}$) of said channel dependent matrix (O);

f. calculating an eigenvector of said channel dependent matrix (O), said eigenvector corresponding to said minimum eigenvalue ($\lambda_{MIN}$);

g. generating said set of T equalizer parameters (W) from said eigenvector, characterized in that said error function comprises a first contribution, representing a difference between said equalized impulse response (EIR) and said target impulse response (TIR), and a second contribution representing an amount of energy ($E_{DC}$) transmitted in unused frequency bands, and further characterized in that said predetermined delay (D) depends upon amplitude and index number of a sample of said transmission line impulse response (LIR) with maximum amplitude.

7. A method for calculating a set of T equalizer parameters (W), T being a positive integer number, for an equalizer included in a receiver to which a transmitter is coupled via a transmission line and which is able to receive a distorted signal (Y) distorted due to transmission over said transmission line of a signal (X), and which is adapted to equalize a transmission line impulse response (LIR) of said transmission line and to thereby generate an equalized impulse response (EIR) which approximates a target impulse response (TIR) with a predetermined target impulse response length (L) delayed over a predetermined delay (D), said method comprising the steps of:

a. transmitting said signal (X) and determining said distorted signal (Y) in said receiver;

b. defining a first integer number of sample periods which represents said target impulse response length (L);

c. defining a second integer number of sample periods which represents said predetermined delay (D);

d. generating a channel dependent matrix (O) from said signal (X), said distorted signal (Y), said target impulse response length (L) and said predetermined delay (D), said channel dependent matrix (O) being related to an error function that has to be minimized;

e. calculating a minimum eigenvalue ($\lambda_{MIN}$) of said channel dependent matrix (O);

f. calculating an eigenvector of said channel dependent matrix (O), said eigenvector corresponding to said minimum eigenvalue ($\lambda_{MIN}$);

g. generating said set of T equalizer parameters (W) from said eigenvector, characterized in that said error function comprises a first contribution, representing a difference between said equalized impulse response (EIR) and said target impulse response (TIR), and a second contribution representing an amount of energy ($E_{DC}$) transmitted in unused frequency bands, and further characterized in that before executing steps f and g, steps c, d, and e are repeatedly executed, said second integer number of sample periods which represents said predetermined delay (D) being different in successive executions of step c but laying within an interval of acceptable delay values, said channel dependent matrix (O) generated in successive executions of step d as a result thereof being different in such a way that a plurality of minimum eigenvalues similar to said minimum eigenvalue ($\lambda_{MIN}$) is calculated in successive executions of said step e, and that to perform steps f and g, only a said channel dependent matrix (O) with smallest said minimum eigenvalue ($\lambda_{MIN}$) is selected.

8. A device for calculating a set of T equalizer parameters (W), T being a positive integer number, for an equalizer included in a receiver to which a transmitter is coupled via a transmission line and which is able to receive a distorted signal (Y) distorted due to transmission over said transmission line of a signal (X), and which is adapted to equalize a transmission line impulse response (LIR) of said transmission line and to thereby generate an equalized impulse response (EIR) which approximates a target impulse response (TIR) with a predetermined target impulse response length, when delayed over a predetermined delay (D), said device including:

a. a first definition means to define a first integer number of sample periods which represents said target impulse response length (L);
 b. a second definition means to define a second integer number of sample periods which represents said predetermined delay (D);
 c. a first generation means to generate a channel dependent matrix (O) from signal (X), said distorted signal (Y), said target impulse response length (L) and said predetermined delay (D), said channel dependent matrix (O) being related to an error function which has to be minimized;
 d. a first calculation means to calculate a minimal eigenvalue ($\lambda_{MIN}$) of said channel dependent matrix (O);
 e. iteration control means adapted to control said second definition means to define a different said second integer number of sample periods laying within an interval of acceptable delay values in successive iterations, adapted to control said first generation means to generate a different said channel dependent matrix (O) in successive iterations as a result thereof, and adapted to control said first calculation means to calculate a plurality of minimum eigenvalues similar to said minimum eigenvalue ($\lambda_{MIN}$) in successive iterations;
 f. selection means to select only a said channel dependent matrix (O) with smallest said minimum eigenvalue ($\lambda_{MIN}$) amongst said plurality of minimum eigenvalues;
 g. a second calculation means to calculate an eigenvector of said channel dependent matrix (O), said eigenvector corresponding to said minimal eigenvalue ($\lambda_{MIN}$);
 h. a second generation means to generate said set of T equalizer parameters (W) from said eigenvector, characterized in that said error function comprises a first contribution, representing a difference between said equalized impulse response (EIR) and said target impulse response (TIR), and a second contribution representing an amount of energy ($E_{DC}$) transmitted in unused frequency bands.

9. A demodulator (DEMOD) including between an input (DI) and an output (DO) thereof, the cascade connection of an analog to digital converter (ADC), a time domain equalizer (TEQ), a serial to parallel converter (SPC) a fast fourier transform processing unit (FFT), a frequency domain equalizer (FEQ) and a demapper (DM), said analog to digital converter (ADC) being provided to convert a disturbed input signal applied to said demodulator input (DI) into a time domain digital signal, said time domain equalizer (TEQ) being provided to digitally filter said time domain digital signal and to thereby generate a time domain equalized signal, said serial to parallel converter (SPC) being provided to transform said time domain equalized signal into a time domain parallel sequence, said fast fourier transform processing unit (FFT) being provided to process said time domain parallel sequence and to thereby generate a frequency domain parallel sequence, said frequency domain equalizer being provided to digitally filter said frequency domain parallel sequence, and, said demapper (DM) being provided to demodulate said frequency domain parallel sequence and to generate therefrom an output signal applied to said demodulator output (DO), said time domain equalizer (TEQ) including a device for calculating a set of T equalizer parameters (W), T being a positive integer number, for said time domain equalizer (TEQ), said demodulator (DEMOD) being coupled to a transmitter via a transmission line and being able to receive a distorted signal (Y) distorted due to transmission over said transmission line of a signal (X), and which is adapted to equalize a transmission line impulse response (LIR) of said transmission line and to thereby generate an equalized impulse response (EIR) which approximates a target impulse response (TIR) with a predetermined target impulse response length (L), when delayed over a predetermined delay (D), said device including:

a. a first definition means to define a first integer number of sample periods which represents said target impulse response length (L);
 b. a second definition means to define a second integer number of sample periods which represents said predetermined delay (D);
 c. a first generation means to generate a channel dependent matrix (O) from said signal (X), said distorted signal (Y), said target impulse response length and said predetermined delay (D), said channel dependent matrix (O) being related to an error function which has to be minimized;
 d. a first calculation means to calculate a minimal eigenvalue ($\lambda_{MIN}$) of said channel dependent matrix (O);
 e. iteration control means adapted to control said second definition means to define a different said second integer number of sample periods laying within an interval of acceptable delay values in successive iterations, adapted to control said first generation means to generate a different said channel dependent matrix (O) in successive iterations as a result thereof, and adapted to control said first calculation means to calculate a plurality of minimum eigenvalues similar to said minimum eigenvalue ($\lambda_{MIN}$) in successive iterations;
 f. selection means to select only a said channel dependent matrix (O) with smallest said minimum eigenvalue ($\lambda_{MIN}$) amongst said plurality of minimum eigenvalues;
 g. a second calculation means to calculate an eigenvector of said channel dependent matrix (O), said eigenvector corresponding to said minimal eigenvalue ($\lambda_{MIN}$);
 h. a second generation means to generate said set of T equalizer parameters (W) from said eigenvector, characterized in that said error function comprises a first contribution, representing a difference between said equalized impulse response (EIR) and said target impulse response (TIR), and a second contribution representing an amount of energy ($E_{DC}$) transmitted in unused frequency bands.

* * * * *